United States Patent [19]

Egley et al.

[11] Patent Number: 5,007,290
[45] Date of Patent: Apr. 16, 1991

[54] METHOD AND APPARATUS FOR PRODUCING PRELOAD OF AN ACCELEROMETER ASSEMBLY

[75] Inventors: Bert Egley, Tacoma; Richard A. Hanson, Redmond, both of Wash.

[73] Assignee: New SD, Inc, San Francisco, Calif.

[21] Appl. No.: 429,709

[22] Filed: Oct. 31, 1989

[51] Int. Cl.⁵ ............................................. G01P 15/08
[52] U.S. Cl. .................................. 73/517 R; 73/493; 73/497; 73/514
[58] Field of Search ...................... 73/514, 493, 517 B, 73/517 R, 431, 652, 35, 505, 510, 504, 497; 228/184

[56] References Cited

U.S. PATENT DOCUMENTS 4,555,944  12/1985  Hanson et al. .................. 73/517 B
4,854,169   8/1989  Sakuma et al. .................. 73/517 B

*Primary Examiner*—Hezron E. Williams
*Assistant Examiner*—C. Miller
*Attorney, Agent, or Firm*—Flehr, Hohbach, Test, Albritton & Herbert

[57] ABSTRACT

What is disclosed is an improved quartz flexure accelerometer including the well-known elements of a quartz reed positioned between a return path and an end cap, the return path and end cap impelling a compressive load on the reed frame as a result of an adhesive and a preload band. The improvement disclosed includes a recess at the outer periphery of the end cap, the recess defining a compliant member at the bottom of the end cap. The compliant member providing greater strain movement, enabling accurate preload setting between the compliant member of the end cap, the adhesive, the preload band, and the return path. The compliant member also providing spring action to maintain a prolonged constant compressive load on the quartz reed.

12 Claims, 2 Drawing Sheets

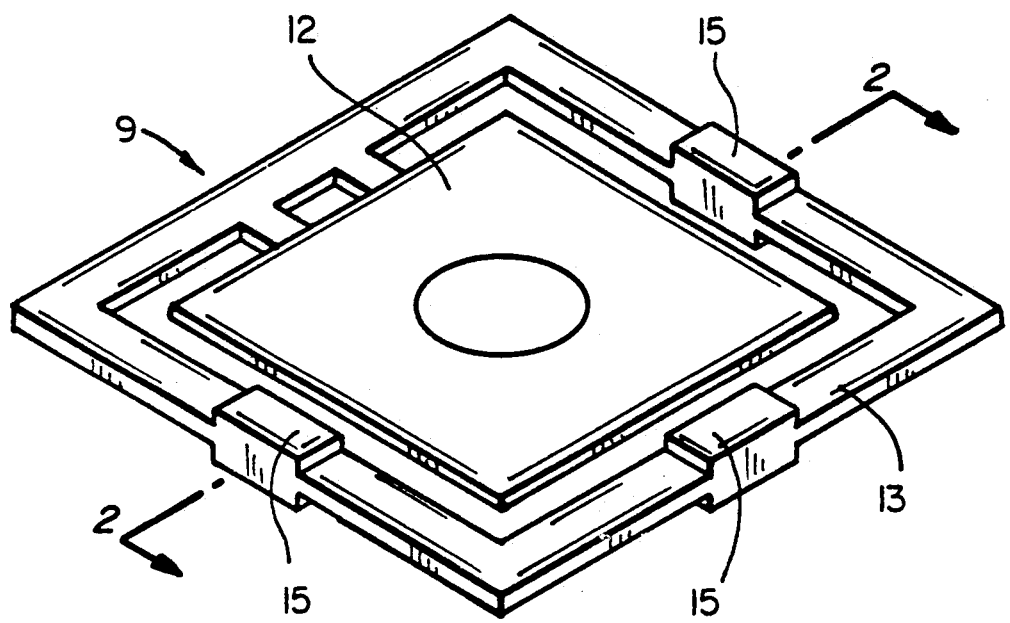
FIG_1
(PRIOR ART)
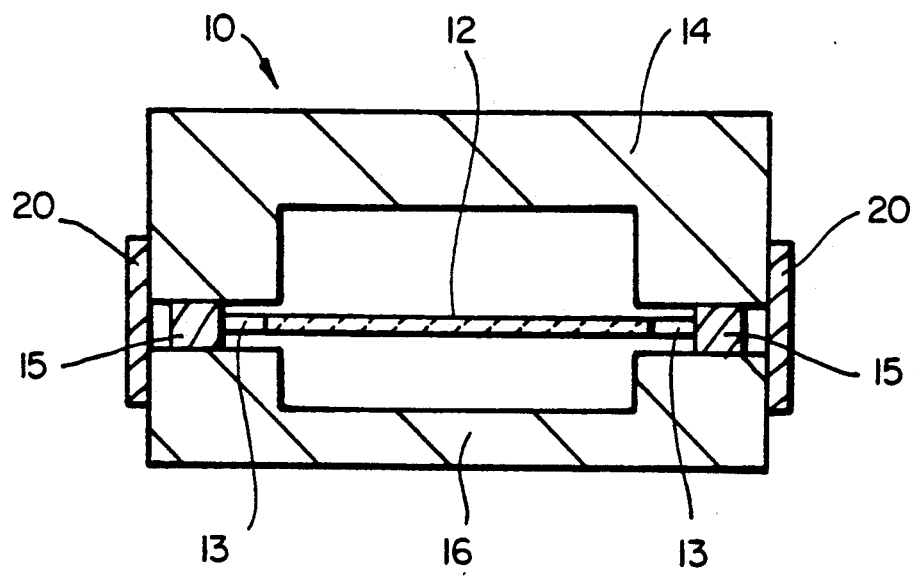
FIG_2
(PRIOR ART)

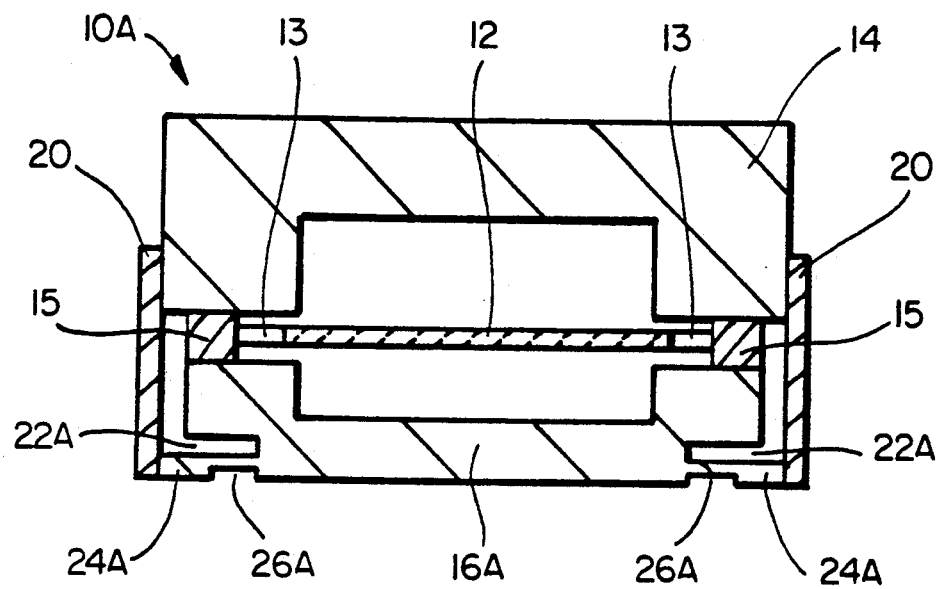
FIG_3
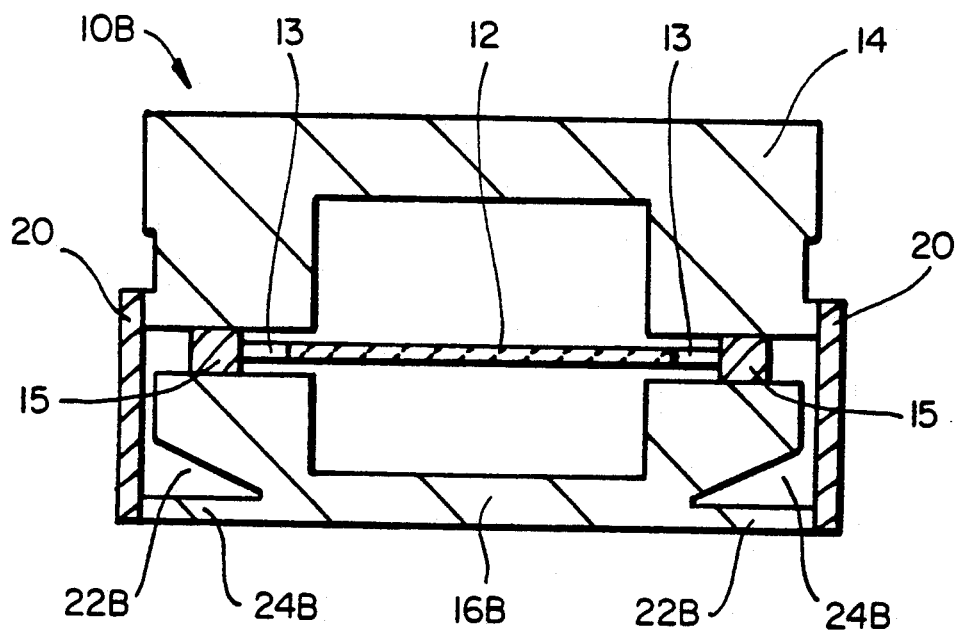
FIG_4

METHOD AND APPARATUS FOR PRODUCING PRELOAD OF AN ACCELEROMETER ASSEMBLY

BRIEF DESCRIPTION OF THE INVENTION

This invention relates generally to accelerometers. More particularly, it relates to accelerometers with a compliant member which enables accurate preload setting and a prolonged constant compressive load.

BACKGROUND OF THE INVENTION

Accelerometers are well known in the art. Typically, an accelerometer includes a return path (or top portion) and an end cap (or bottom portion). A reed, or proof-mass, preferably constructed of quartz and supported by an integral frame, is placed between and supported by the return path and the end cap for pivotal movement (to a limited extent) in response to acceleration forces. Known sensing means measure these forces acting on the proofmass which must be allowed to pivot freely relative to its frame and the return path and end cap.

A preload band, in conjunction with an adhesive, binds the return path and the end cap together. The band is applied after a predetermined compressive force is imparted upon the return path and the end cap with the proofmass frame held therebetween. Applied in this manner, the preload band endeavors to maintain the imparted compressive load upon the frame of the quartz proofmass (actually upon the mounting pads of the frame) which lies between the return path and the end cap.

For the sensor means, and thus the accelerometer, to function properly, there must be a constant compressive load on the frame supporting the quartz reed. Accelerometer performance will be directly affected by any variations in the compressive load on the frame if these variations are imparted to the proofmass or reed itself.

Thus, from the outset, an accelerometer must have a constant and clearly defined load on the quartz reed frame. Unfortunately, such a preload is difficult to realize. A typical preload of 25 pounds requires only 0.00004 inches compression of the return path, end cap, and reed. Because accurate preloads are a necessity and achieving these accurate loads entails working with such minuscule lengths, it is very difficult to realize a high precision accelerometer.

Another problem with accelerometers arises after the preload is imparted. As a result of the various coefficients of expansion for the distinct components of the accelerometer, under varying temperature conditions, these components experience differential expansion. Variations in the preload result under these circumstances. Since coefficients of expansion are an inherent quality of the materials used, it is very difficult to combat this intrinsic deficiency in accelerometers.

A similar problem results when the adhesive binding the end cap and the return path begins to degenerate. Naturally, any adhesive will eventually lose its ability to bind. Consequently, there is an inevitable breakdown of the preload balance. Again, this degradation in performance is inherent in accelerometer design.

OBJECTS AND SUMMARY OF THE INVENTION

It is a general object of the present invention to provide a nearly constant compressive load on the reed frame of an accelerometer.

A related object of the present invention is to provide a readily realizable and accurately preloaded accelerometer.

A further related object of the present invention is to provide an accelerometer which mitigates the typical degenerative loss of a preload balance.

The foregoing and other objects are achieved by an improved accelerometer. The improved accelerometer includes the known elements of a generally planar proofmass assembly supported between upper and lower members which are clamped together under a compressive load normal to the plane of the proofmass. It also includes the known element of a band which clamps the upper and lower members by means of an adhesive, solder, braze, or weld. The improvement of the present invention includes compliant means forming part of one of the members. The compliant means are more compliant than the rest of the member on which they are supported. This allows the compliant means to compress a greater distance under and in the direction of the compressive load compared to the rest of the member on which the means is supported. This compliant feature allows accurate setting and maintenance of the compressive load.

BRIEF DESCRIPTION OF THE DRAWINGS

Other objects and advantages of the invention will become apparent upon reading the following detailed description and upon reference to the drawings, in which:

FIG. 1 is a perspective view of a prior art reed frame of an accelerometer.

FIG. 2 is a cross-sectional side elevational view of a prior art accelerometer including the reed frame along the line 2—2 of FIG. 1.

FIG. 3 is a cross-sectional side elevational view of one embodiment of the accelerometer of the present invention, including an end cap with a rectangular recess defining a compliant member at the bottom of the end cap.

FIG. 4 is a cross-sectional side elevational view of another embodiment of the accelerometer of the present invention, including an end cap with a triangular recess defining a compliant member at the bottom of the end cap.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Turning now to the drawings, wherein like components are designated by like reference numerals in the various figures, attention is initially directed to FIG. 1. The Figure depicts a perspective view of a proofmass assembly 9 forming part of an accelerometer in the prior art. The proofmass assembly 9 includes a reed 12 pivotally supported from a frame 13 having mounting pads 15.

Referring now to FIG. 2, the figure depicts, among other known components, a cross-sectional side elevational view of the prior art proofmass assembly 9 of FIG. 1. The reed 12, forming part of proofmass assembly 9 is positioned between a return path 14 and an end cap 16. These elements are bound together by an adhesive and a preload band 20. The adhesive, which can be any adhesive well-known in the art, forms a tight bond between the preload band 20, the return path 14, and the end cap 16. The preload band 20 circumscribes the accelerometer 10 and preferably is continuously bonded to it.

Techniques for applying the preload band 20 are well known in the art. Generally, the frame 13 supporting quartz reed 12 is placed between the return path 14 and end cap 16 while an adhesive is applied to the preload band 20. Thereafter the return path 14 and the end cap 16 are compressed by a force normal to their planes. The amount of compression is measured in order to set a definite preload on the frame 13. The preload band is then applied during the compression. The compression is held until the adhesive dries. Thereafter the preload is maintained by the adhesive and the preload band 20.

While the method of applying the preload band 20 and the preload band's function are appreciable from the prior discussion and with reference to FIGS. 1 and 2, the discussion and figures have not explicitly revealed the problems which typically arise in the prior art.

First, it is very difficult to impart a precise preload. The accelerometer 10 typically has a compression of 1 million pounds per inch. Thus, a large force is associated with minute distances. Such distances are difficult to accurately measure and, as a result, the imparted force is difficult to accurately measure.

In addition to the problem of achieving a precise preload, it is difficult to maintain that preload. The preload degenerates under high thermal conditions as a result of different coefficients of expansion of the various components of the accelerometer depicted in FIGS. 1 and 2. The preload also degenerates as a result of the time-induced degradation of the adhesive.

The present invention rectifies these problems as can be appreciated by reference to FIG. 3. In the figure, a cross-sectional side elevational view of one embodiment of the accelerometer of the present invention is revealed. In contrast to the accelerometer 10 of FIG. 2, in this embodiment, which is generally indicated as 10A, the end cap 16A of this accelerometer includes a recess 22A which defines a compliant member 24A at the bottom of the end cap 16A.

The recess 22A, preferably, circumscribes the end cap 16A, however, a series of discreet recesses along the circumference of the end cap 16A may be employed in the alternative. The end cap 16A preferably includes a bottom recess 26A positioned near the interior end of recess 22A. Preferably, this recess circumscribes the end cap as well. In general, it provides greater compliance for the compliant member 24A, the importance of this feature to be more fully described herein.

If using a standard sized accelerometer, preferably the recess 22A is approximately 0.033 inches high and 0.076 inches deep and centered approximately 0.0365 inches from the bottom of the end cap 16A. Preferably, the bottom recess 26A is approximately 0.010 inches deep and 0.025 inches wide and centered approximately 0.0635 inches from the outer periphery of the end cap 16A. While these dimensions have been particularly advantageous, other dimensions are possible as well.

Turning to FIG. 4, an alternate embodiment of the present invention is depicted. This figure reveals a cross-sectional side elevational view of an accelerometer 10B. In accordance with the present invention, the accelerometer includes a recess 22B which defines a compliant member 24B. Unlike the embodiment of FIG. 3, in this embodiment, the recess 22B assumes a generally triangular shape. It will be clear to those skilled in the art that recesses of still other shapes may be successfully employed in accordance with the present invention.

Whichever embodiment is chosen, the recess and the resultant compliant member dramatically improve the accelerometer. One improvement relates to the setting of the preload. As in the prior art, the frame supporting the quartz reed 12 is placed between the return path 14 and the end cap 16. A compressive force is then levied upon the return path and the end cap. However, as a result of the recess 24A or 24B, the compliant members move a substantial distance in response to the force and consequently the compression is more readily measurable.

Thus, using conventional techniques to measure the distance of compression and the weight of the compressive force, a more accurate compression may be realized. After a desired compression is reached, the preload band 20 is held against the return path and end cap until it is adhesed, soldered, brazed, or welded to them.

The movement of the compliant member 24A or 24B in this manner lends itself to a vast improvement in the accurate setting of preloads. In the prior art, setting a 25 pound preload required 0.00004 inches of compression of the return path and end cap. With the present invention, a 25 pound preload is obtained through a bending of the compliant member 0.003 inches. This is a 75/1 improvement over the prior art.

In addition to the vast improvement in preload setting, the present invention provides for prolonged maintenance of that preload setting. In the prior art, because of the various coefficients of expansion, differential expansion of the distinct components of the accelerometer occurred under varying temperature conditions.

The resultant disruption to the preload balance does not tend to occur with the present invention because the differential expansion of the distinct components is offset by the spring action of the compliant member 24A or 24B. That is, the compliant member 24A or 24B maintains a near constant load on the quartz reed 12 by providing uniform spring action despite differential expansion of the distinct components of the accelerometer.

In a similar manner, under the present invention, there is a mitigation of the disruptive effect on the preload caused by the degradation of the adhesive. With time, the adhesive naturally degrades and the carefully measured preload is disrupted. In the present invention, despite the degradation of the adhesive, the preload balance is largely maintained because of the spring action of the compliant member 24.

Thus, it is apparent that there has been provided, in accordance with the invention, an improved accelerometer that fully satisfies the objects, aims, and advantages set forth above. While the invention has been described in conjunction with specific embodiments thereof, it is evident that many alternatives, modifications, and variations will be apparent to those skilled in the art in light of the foregoing description. For example, the recess and compliant member disclosed herein may be formed on the return path 14. Accordingly, the description is intended to embrace all such alternatives, modifications, and variations as fall within the spirit and scope of the appended claims.

What is claimed is:

1. In an accelerometer in which a generally planar proofmass assembly is supported between upper and lower members clamped together under a compressive load normal to the plane of said proofmass by band means bonded to the upper and lower members, the improvement comprising means forming part of at least one of said members, said last-mentioned means being more compliant in the direction of said compressive load than the rest of said one member and the other of said members, whereby said more compliant means compresses a greater distance under and in the direction of said compressive load than the rest of said one member and the other member, and wherein said band means is bonded to said more compliant means of one member, with the latter in its compressed position, and to the other of said members, whereby to maintain said members including said compliant means under said compressive load.

2. The improvement according to claim 1 wherein said more compliant means is an integrally formed segment of said one member.

3. The improvement according to claim 2 wherein said integrally formed segment is defined by one end of said one member and a spaced recess extending into said one member from one side thereof.

4. The improvement according to claim 3 wherein the cross-section of said recess is rectangular.

5. The improvement according to claim 3 wherein the cross-section of said recess is v-shaped.

6. The improvement according to claim 3 wherein said one end of said one member includes a second recess therein.

7. In a quartz flexure accelerometer wherein a preload band, in conjunction with a joining means such as an adhesive, solder, braze, or weld binds together a return path and an end cap and thereby maintains a compressive load on the frame of a quartz read positioned between said return path and said end cap, the improvement comprising:

one of said end cap or return path including compliant means for establishing a greater strain movement, thereby enabling accurate preload setting between said compliant means, said joining means, said preload band, and said return path, and whereby said means provides a spring action to maintain a prolonged constant compressive load on the frame of said quartz reed.

8. The improvement of claim 7 wherein said means includes a recess at the outer periphery of said end cap or return path such that said recess defines a compliant member at the bottom of said end cap.

9. The improvement of claim 8 wherein said recess defines a generally triangular region.

10. The improvement of claim 8 wherein said recess defines a generally rectangular region.

11. The improvement of claim 10 wherein the bottom of said end cap includes a bottom recess.

12. A method of connecting a return path, an end cap, a reed, and a preload band in an accelerometer wherein said end cap or return path includes a recess at its outer periphery which defines a compliant member at the bottom of said end cap, said method comprising:

placing said reed between said return path and said end cap;

imparting a compressive force normal to the planes of said return path and said end cap;

refining the amount of said compressive force in response to the movement of said compliant member;

placing an adhesive, solder, braze, or weld on said preload band;

holding said preload band against said return path and said end cap including the compliant member forming part of either the end cap or return path during said compression until said adhesive dries or parts are soldered, brazed, or welded.

* * * * *